US007844783B2

(12) United States Patent
Addison et al.

(10) Patent No.: US 7,844,783 B2
(45) Date of Patent: Nov. 30, 2010

(54) METHOD FOR AUTOMATICALLY DETECTING AN ATTEMPTED INVALID ACCESS TO A MEMORY ADDRESS BY A SOFTWARE APPLICATION IN A MAINFRAME COMPUTER

(75) Inventors: Edward Alan Addison, Raleigh, NC (US); Tracy Michael Canada, Fuquay Varina, NC (US); Michael Vann, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 11/551,941

(22) Filed: Oct. 23, 2006

(65) Prior Publication Data

US 2008/0098189 A1  Apr. 24, 2008

(51) Int. Cl.
  G06F 12/00   (2006.01)
  G06F 17/30   (2006.01)
  G06F 11/00   (2006.01)

(52) U.S. Cl. .................. 711/152; 711/163; 726/17; 726/26; 726/34

(58) Field of Classification Search ............ 711/163, 711/173, 152, E21.099, E12.103; 726/34, 726/26, 17
See application file for complete search history.

(56) References Cited

U.S. PATENT DOCUMENTS

| 5,754,762 | A  | * | 5/1998  | Kuo et al. ............. 726/23 |
| 6,295,533 | B2 |   | 9/2001  | Cohen |
| 6,449,699 | B2 | * | 9/2002  | Franke et al. ........... 711/147 |
| 6,539,378 | B2 |   | 3/2003  | Gupta et al. |
| 6,542,919 | B1 | * | 4/2003  | Wendorf et al. ......... 718/100 |
| 6,970,980 | B2 | * | 11/2005 | Cypher et al. ........... 711/141 |
| 6,973,545 | B2 | * | 12/2005 | Cypher .................. 711/141 |
| 2002/0188852 | A1 | * | 12/2002 | Masaki et al. ........... 713/182 |
| 2005/0075912 | A1 | * | 4/2005  | Bealke et al. ............ 705/4 |
| 2005/0114616 | A1 | * | 5/2005  | Tune et al. ............. 711/163 |
| 2005/0216686 | A1 | * | 9/2005  | Matsuyama ............. 711/163 |
| 2007/0055837 | A1 | * | 3/2007  | Rajagopal et al. ........ 711/163 |
| 2008/0086738 | A1 | * | 4/2008  | Nieminen .............. 719/328 |

OTHER PUBLICATIONS

Robert F. Rosin, Supervisory and Monitor Systems, Mar. 1969, pp. 37-54, Computing Surveys, vol. 1, No. 1.
Proceedings of the Signum Conference on the Programming Environment for Development of Numerical Software, Oct. 1978, pp. 28-117.

* cited by examiner

*Primary Examiner*—Kevin L Ellis
*Assistant Examiner*—Mehdi Namazi
(74) *Attorney, Agent, or Firm*—Cantor Colburn LLP; Jeanine Ray

(57) ABSTRACT

A method for automatically detecting an attempted invalid access to a memory address in accordance with an exemplary embodiment is provided. The method includes reading a first data set having a software application name and a memory address stored therein utilizing the mainframe computer. The memory address indicates a portion of a memory that is not allowed to be changed. The method further includes detecting when a software application is attempting to access the memory address and setting a first bit in the memory to a first value in response to the detection utilizing the mainframe computer. The method further includes storing a name of the software application, the memory address, and contents of the portion of the memory specified by the memory address, in a second data set, when the first bit has the first value utilizing the mainframe computer. The method further includes displaying an error message on a display device when the first bit has the first value.

4 Claims, 3 Drawing Sheets

METHOD FOR AUTOMATICALLY DETECTING AN ATTEMPTED INVALID ACCESS TO A MEMORY ADDRESS BY A SOFTWARE APPLICATION IN A MAINFRAME COMPUTER

FIELD OF INVENTION

This application relates to a method for automatically detecting an attempted invalid access to a memory address by a software application in a mainframe computer.

BACKGROUND OF INVENTION

Mainframe computers utilize software applications to perform various tasks. Each software application generally has a designated memory block that it can access and utilize for performing tasks. Further, a portion of the designated memory block may contain data that is designated as unchangeable. However, another software application may undesirably attempt to access or write to the designated memory block. When this occurs, the software application designated to utilize the designated memory block may not execute as desired or may have an abnormal ending.

Accordingly, the inventors herein have recognized a need for automatically detecting an invalid access to a memory address in a memory block.

SUMMARY OF INVENTION

A method for automatically detecting an attempted invalid access to a memory address by a software application in a mainframe computer in accordance with an exemplary embodiment is provided. The method includes reading a first data set having a software application name and a memory address stored therein utilizing the mainframe computer. The memory address indicates a portion of a memory that is not allowed to be changed. The method further includes detecting when the software application is attempting to access the memory address and setting a first bit in the memory to a first value in response to the detection utilizing the mainframe computer. The method further includes storing a name of the software application, the memory address, and contents of the portion of the memory specified by the memory address, in a second data set, when the first bit has the first value utilizing the mainframe computer. The method further includes displaying an error message on a display device when the first bit has the first value.

DESCRIPTION OF AN EMBODIMENT

Figure 1:
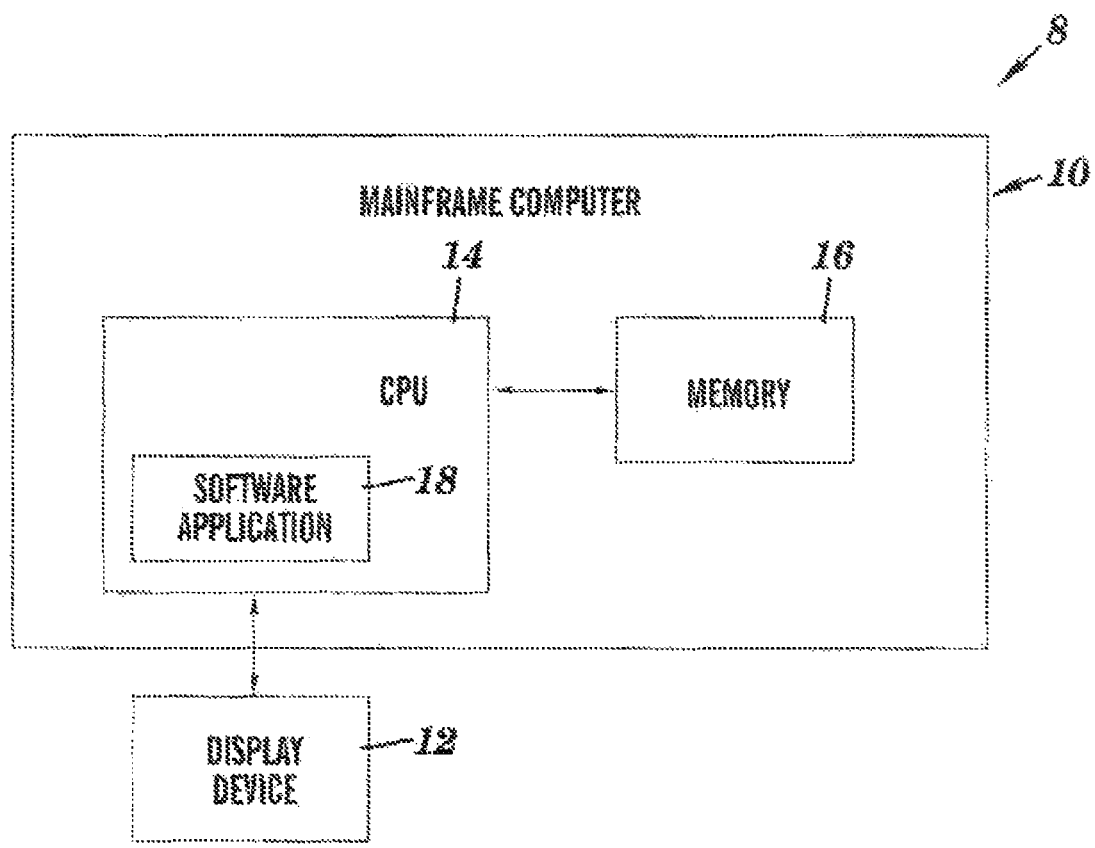
FIG. 1 is a block diagram of a system for automatically detecting an attempted invalid assess to a memory address in accordance with an exemplary embodiment.
Figure 2:
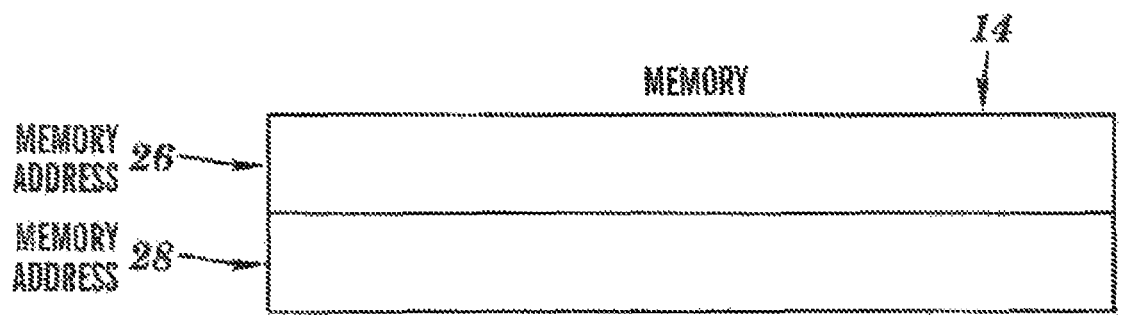
FIG. 2 is a block diagram of a memory utilized by the system of FIG. 1.

Referring to FIGS. 1 and 2, a system 8 for automatically detecting an attempted invalid access to memory address is illustrated. The system 8 includes a mainframe computer 10 and a display device 12.

The mainframe computer 10 includes a central processing unit 14, a memory 16, and a software application 18. The mainframe computer 10 is configured to read a first data set or file having: (i) a software application name, and (ii) a designated memory address 26 stored therein wherein the memory address 26 indicates a portion of the memory 16 that is not allowed to be changed. The mainframe computer 10 is further configured to execute the software application 18 and to detect when the software application 18 attempts to invalidly access the designated memory address 26 in the memory 16. Further, when such a detection occurs, the mainframe computer 10 is further configured to store the name of the software application 18, the memory address 26 being accessed, and any data being written to the memory address 26 by the software application 18, in a data set or file. Further, the mainframe computer 10 is further configured to display an error message on the display device 12 indicating that the software application 18 is attempting to invalidly access the memory address 26.

The memory 14 operably communicates with the central processing unit (CPU) 14 of the mainframe computer 10. The memory 14 includes at least a memory address 26 and a memory address 28. The memory address 26 is designated as not being allowed to be changed.

The display device 12 is operably coupled to the CPU 14 of the mainframe computer 10. In one exemplary embodiment, the display device 12 comprises a CRT device.

Figure 3:
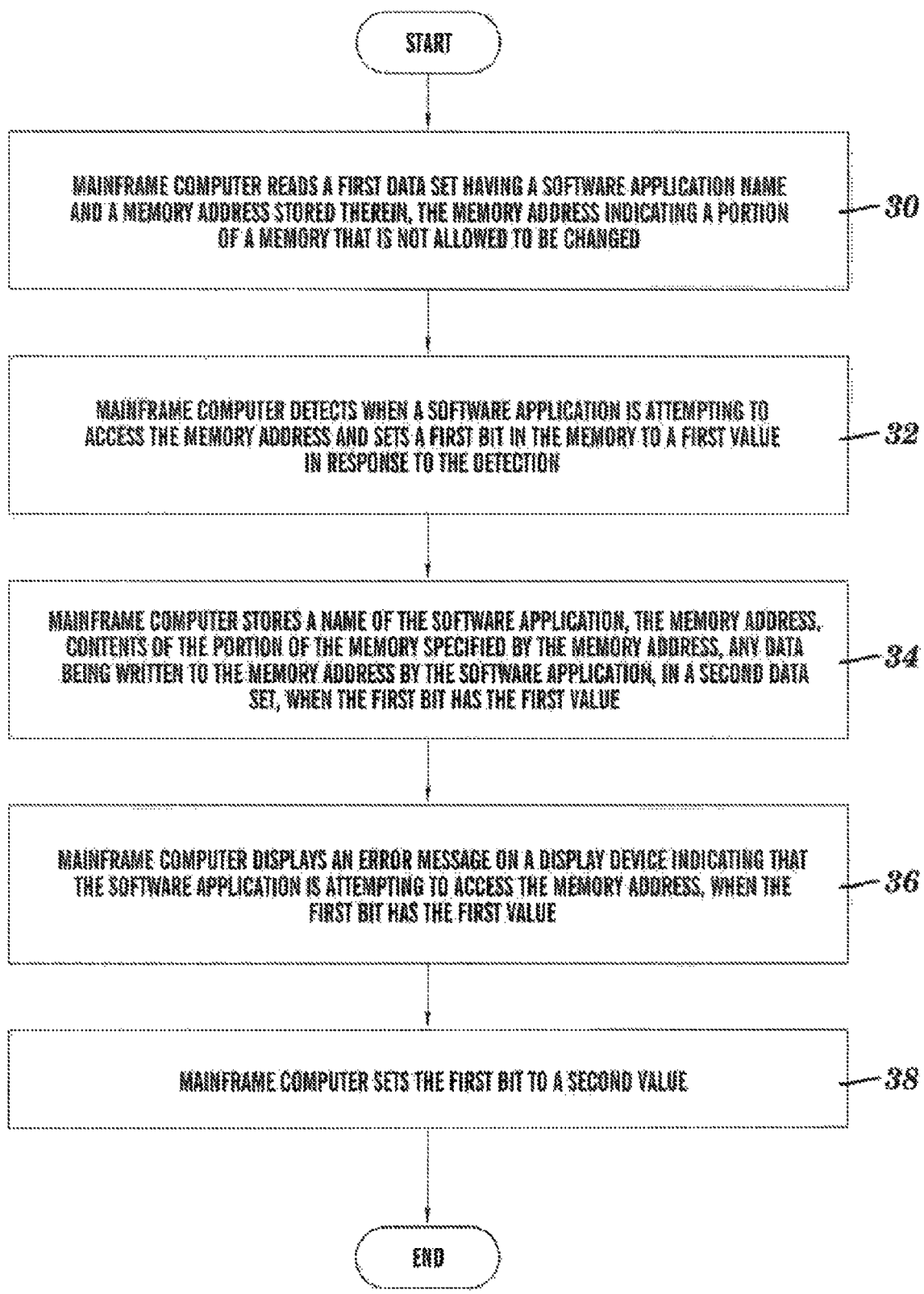
FIG. 3 is a flowchart of a method for automatically detecting an attempted invalid access to a memory address in accordance with another exemplary embodiment.

Referring to FIG. 3, a method for automatically detecting an attempted invalid access of the memory location 26 by the software application 8 in the mainframe computer 10 will now be described. The following method can be implemented utilizing a software algorithm executing on the CPU 14.

At step 30, the mainframe computer 10 reads a first data set having a software application name and a memory address 26 stored therein. The memory address 26 indicates a portion of the memory 14 that is not allowed to be changed.

At step 32, the mainframe computer 10 detects when the software application 18 is attempting to access the memory address 26 and sets a first bit in the memory 16 to a first value in response to the detection. For example, the mainframe computer 10 can set the first bit equal to a binary "1" value.

At step 34, the mainframe computer 10 stores a name of the software application 18, the memory address 26, contents of the portion of the memory 16 specified by the memory address 26, any data being written to the memory address 26 by the software application 18 in a second data set, when the first bit has the first value.

At step 36, the mainframe computer 10 displays an error message on the display device 12 indicating that the software application 18 is attempting to access the memory address 26, when the first bit has the first value.

At step 38, the mainframe computer 10 sets the first bit to a second value. For example, the mainframe computer 10 can set the first bit equal to a binary "0" value. After step 38, the method is exited.

Figure 4:
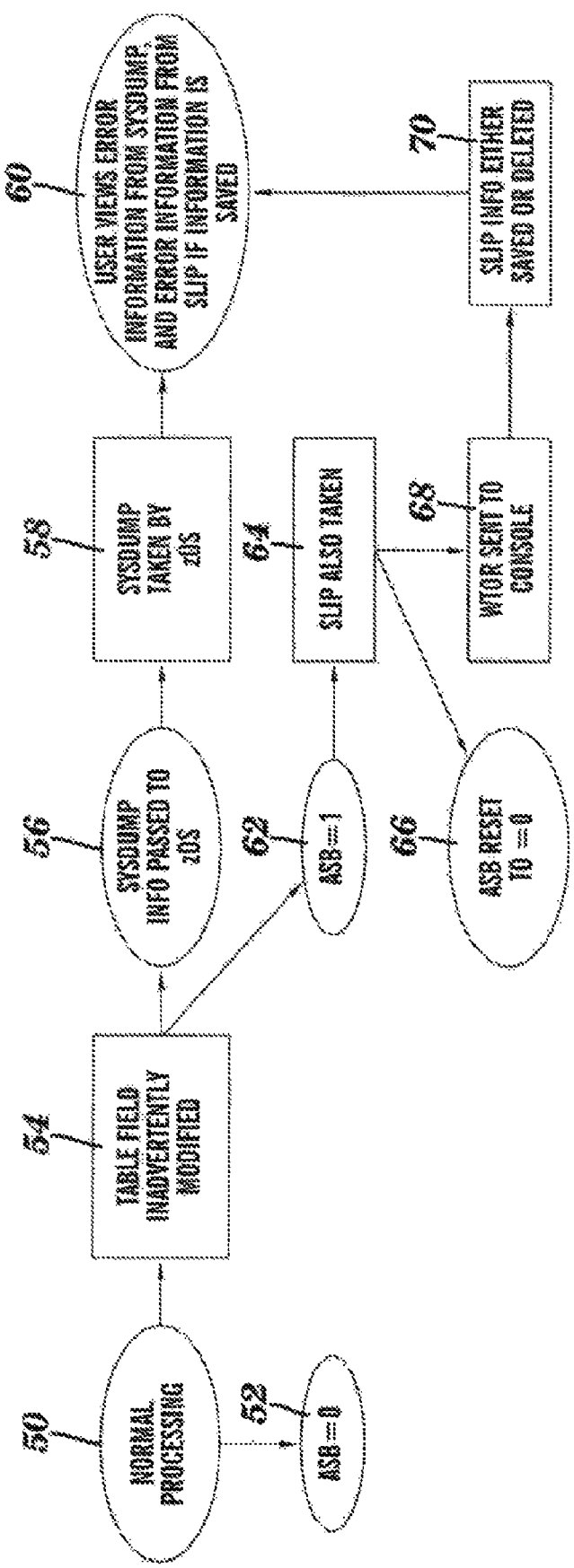
FIG. 4 is a flowchart of a method for automatically detecting an attempted invalid access to a memory address in accordance with another exemplary embodiment.

Referring to FIG. 4, another method for automatically detecting an attempted invalid access of the memory location by a software application in the mainframe computer 10 will now be described. The following method can be implemented utilizing a software algorithm executing on the CPU 14.

At step 50, the software application in the mainframe computer 10 has normal processing functionality.

At step 52, the mainframe computer 10 sets an automatic slip bit (ASB) equal to "0" when the mainframe computer 10 has normal processing functionality.

At step 54, the mainframe computer 10 detects that a table has been inadvertently modified. In particular, the mainframe computer 10 utilizes a library (e.g. sys1.parmlib) which includes the following information: (i) a member name for the subsystem application (e.g., CICS), and (ii) the following fields associated with each subsystem name (a) a table name, and (b) an unmodified field name within the table.

At step 62, when the mainframe computer 10 detects an abnormal ending (ABEND) of the software application associated with the table name specified above, the mainframe computer 10 sets that ASB="1."

At step 64, after step 62, the mainframe computer 10 performs a serviceability level indicator processor (SLIP) function that collects system level information or files stored in the memory 16.

At step 66, after step 64, the mainframe computer 10 resets the ASB="0."

At step 68, after step 64, the mainframe computer 10 performs a write to operator with reply (WTOR) function which allows a user to select whether or not to save the system level information obtained from the SLIP function.

At step 70, the system level information obtained from the SLIP function is either saved to memory 16 or is deleted, based on the user selection at step 68.

Referring to step 56, when the mainframe computer 10 detects an abnormal ending (ABEND) of the software application associated with the table name specified above, the mainframe computer 10 performs a system dump (SYS-DUMP) function which routes system level files containing error information to an operating system.

At step 58, after step 56, the operating system (e.g., ZOS operating system) receives the information from the SYS-DUMP function.

At step 60, which occurs after steps 58 and 70, a user can view error information from the SYSDUMP function, and error information from the SLIP function if the user selected to save the information related thereto. After step 60, the method is exited.

The method for automatically detecting an attempted invalid access to a memory location provides a substantial advantage over other methods. In particular, the method provides a technical effect of determining when a software application attempts and invalid access of the memory location and then storing the name of the software application, the memory address, and the contents of a portion of the memory specified by the memory address in a data set for software debugging purposes.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, is intended that the invention not be limited the embodiment disclosed for carrying out this invention, but that the invention includes all embodiments falling with the scope of the intended claims. Moreover, the use of the term's first, second, etc. does not denote any order of importance, but rather the term's first, second, etc. are used to distinguish one element from another.

We claim:

1. A method for automatically detecting an attempted invalid access to a memory address by a software application in a mainframe computer, comprising:

reading a first data set having a software application name and a memory address stored therein utilizing the mainframe computer, the memory address indicating a portion of a memory that is not allowed to be changed;

detecting when the software application is attempting to access the memory address and setting a first bit in the memory to a first value in response to the detection utilizing the mainframe computer;

storing a name of the software application, the memory address, and contents of the portion of the memory specified by the memory address, in a second data set, when the first bit has the first value utilizing the mainframe computer; and displaying an error message on a display device when the first bit has the first value.

2. The method of claim 1, further comprising storing data being written to the memory address by the software application in the second data set.

3. The method of claim 1, wherein the error message indicates that the software application is attempting to access the memory address.

4. The method of claim 1, further comprising setting the first bit to a second value.

* * * * *